(12) United States Patent
Lee-Liao

(10) Patent No.: US 7,108,013 B2
(45) Date of Patent: Sep. 19, 2006

(54) RELIEF VALVE ASSEMBLY

(76) Inventor: Man Lee-Liao, No. 432, Chang Ping East 5th Road, Pei Tun District, Taichung (TW)

( * ) Notice: Subject to any disclaimer, the term of this patent is extended or adjusted under 35 U.S.C. 154(b) by 62 days.

(21) Appl. No.: 11/042,459

(22) Filed: Jan. 25, 2005

(65) Prior Publication Data

US 2006/0162796 A1    Jul. 27, 2006

(51) Int. Cl.
*F16K 11/20* (2006.01)
(52) U.S. Cl. .................................. 137/881; 251/210
(58) Field of Classification Search ............... 137/881; 251/210
See application file for complete search history.

(56) References Cited

U.S. PATENT DOCUMENTS

| | | | | |
|---|---|---|---|---|
| 2,403,028 A | * | 7/1946 | Smith | 251/210 |
| 2,912,001 A | * | 11/1959 | Green | 137/516.29 |
| 3,171,440 A | * | 3/1965 | Napolitano | 137/630.19 |
| 4,228,987 A | * | 10/1980 | Potter | 251/210 |
| 4,531,545 A | * | 7/1985 | Muchow | 137/625.39 |
| 4,659,061 A | * | 4/1987 | Scheffel | 251/332 |
| 5,127,437 A | * | 7/1992 | Ross, II | 137/614.18 |
| 5,244,007 A | * | 9/1993 | Glave | 137/212 |
| 6,182,700 B1 | * | 2/2001 | Hannemann et al. | 137/881 |

\* cited by examiner

*Primary Examiner*—John Fox
(74) *Attorney, Agent, or Firm*—Alan D. Kamrath; Nikolai & Mersereau, P.A.

(57) ABSTRACT

A relief valve assembly is disclosed to include a casing, an one-way valve mounted in the fluid input end of the casing for guiding in a fluid, and a relief control valve installed in the casing between the fluid input end and fluid output end and controllable to reduce the inside pressure of the casing, the relief control valve including a guide tube fastened to the casing in fluid communication between the fluid input end and fluid output end of the casing, a valve stem axially movably inserted through the guide tube, an O-ring in a groove around the valve stem between the head of the valve stem and a flange at one end of the stem body of the valve stem, and a spring member connected between the guide tube and one end of the valve stem to hold the valve stem in the close position to close the passage of the guide tube, and a control member fastened to one end of the valve stem outside the guide tube for pressing by hand to move the valve stem to the open position to open the passage of the guide tube.

14 Claims, 8 Drawing Sheets

RELIEF VALVE ASSEMBLY

BACKGROUND OF THE INVENTION

1. Field of the Invention

The present invention relates generally to a relief valve assembly and more particularly, to an improved structure of relief valve assembly, which has a good sealing function.

2. Description of the Related Art

FIG. 1 shows a relief valve assembly according to the prior art. According to this design, the relief valve assembly comprises a casing 70, an one0way valve 80, and a relief control valve 90. The casing 70 has an input end and an output end. The one-way valve 80 has one end connected to the input end of the casing 70 and the other end connected to a fluid supply device (not shown) for guiding a fluid from the fluid supply device into the inside of the casing 70. The output end of the casing 10 is mounted with a pressure gage (not shown) that measures and indicates the fluid pressure inside the casing 70. Further, the casing 70 has a radial through hole 71 formed in the periphery in fluid communication between the input end and output end of the casing 70. The relief control valve 90 is installed in the radial through hole 71 of the casing 70, and can be controlled to discharge the fluid out of the casing 10.

The aforesaid relief control valve 90 comprises a guide tube 91, which defines a passage 92, a valve stem 93, which has a stem body 95 axially movably inserted into the passage 92, a head 94 fixedly connected to one end of the stem body 95 outside the guide tube 91 and adapted to seal the passage 92 of the guide tube 91, and a groove 96 extending around the periphery between the head 94 and the stem body 95, an O-ring 97 fastened to the groove 96, a spring member 98 sleeved onto the stem body 95 of the valve stem 93 and connected between one end of the stem body 95 of the valve stem 93 remote from the head 94 and a part inside the guide tube 91 to hold the valve stem 93 in the close position to block the passage 92 of the guide tube 91, and a control member 99 threaded onto one end of the stem body 95 of the valve stem 93 for pressing by hand to move the valve stem 93 from the close position to the open position to open the passage 92 of the guide tube 91.

The aforesaid relief valve assembly is still not satisfactory in function. Because the O-ring 97 is directly mounted in the groove 96 around the periphery of the valve stem 93 and kept in contact with the inside wall of the guide tube 91, the O-ring 97 may be retained to the inside wall of the guide tube 91 during an axial movement of the valve stem 93 between the close position and the open position, thereby causing the valve stem 93 unable to function normally (see FIG. 2). When a high-pressure fluid is continuously supplied into the casing 70, the O-ring 97 may be forced to deform Excessive deformation of the O-ring causes the formation of a gap in between the guide tube 91 and the valve stem 93, and the fluid will leak out of the relief control valve 90.

Therefore, it is desirable to provide a relief control valve, which eliminates the aforesaid problems.

SUMMARY OF THE INVENTION

The present invention has been accomplished under the circumstances in view. It is the main object of the present invention to provide a relief valve assembly, which keeps the O-ring firmly secured to the valve stem of the relief control valve, preventing a leakage.

To achieve this and other objects of the present invention, the relief valve assembly comprises a casing, the casing having a fist end, and a second end, an one-way valve mounted in the first end of the casing for allowing a fluid to pass through the first end of the casing toward the second end of casing and prohibiting reverse flow of the fluid out of the casing through the first end of the casing; and a relief control valve installed in the casing between the first end and second end of the casing and controllable to discharge the fluid out of the casing through the relief control valve. The relief control valve comprises a guide tube fastened to the casing, the guide tube comprising a passage extending through two distal ends thereof in fluid communication between the first end and second end of the casing, the guide tube having a stop flange at one end of the passage of the guide tube; a valve stem axially movable inserted through the guide tube, the valve stem comprising a head for stopping against the stop flange of the guide tube to seal the passage of the guide tube, a stem body extending from the head, a flange extending around the periphery of one end of the stem body, and a groove extending around the periphery of the valve stem between the head and the flange at the stem body of the valve stem; an O-ring mounted in the groove of the valve stem and stopped between the head of the valve stem and the flange of the stem body; and a spring member sleeved onto the stem body and stopped between a part inside the guide tube and one end of the stem body of the valve stem remote from the head of the valve stem to support the valve stem in a close position where the head of the valve stem is stopped against the stop flange of the guide tube and the O-ring is stopped at one end of the passage of the guide tube to block the passage of the guide tube and for enabling the valve stem to be moved axially relative to the guide tube from the close position to an open position to move the head and the O-ring away from the guide tube and to open the passage of the guide tube.

DETAILED DESCRIPTION OF THE INVENTION

Figure 1:
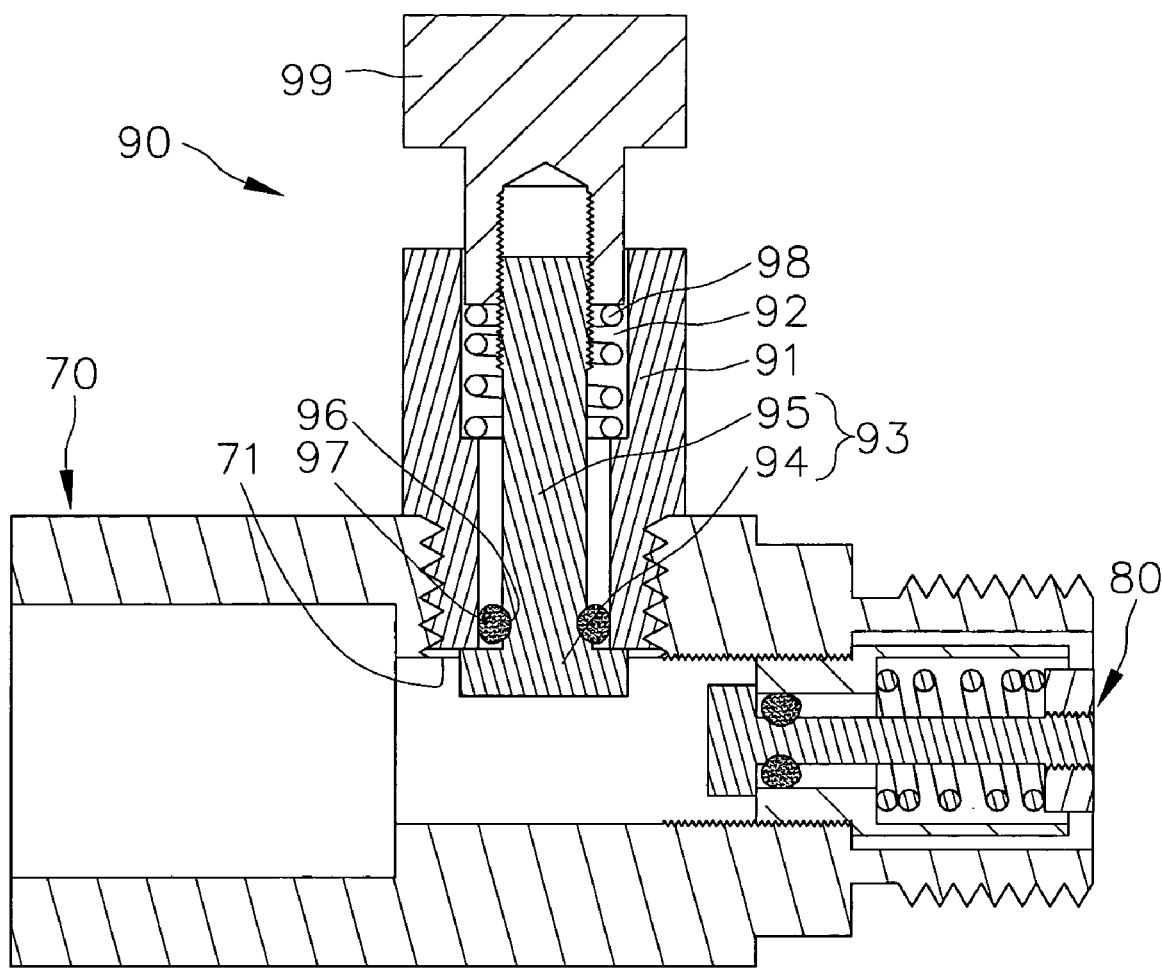
FIG. 1 is a sectional view of a relief valve assembly according to the prior art.
Figure 2:
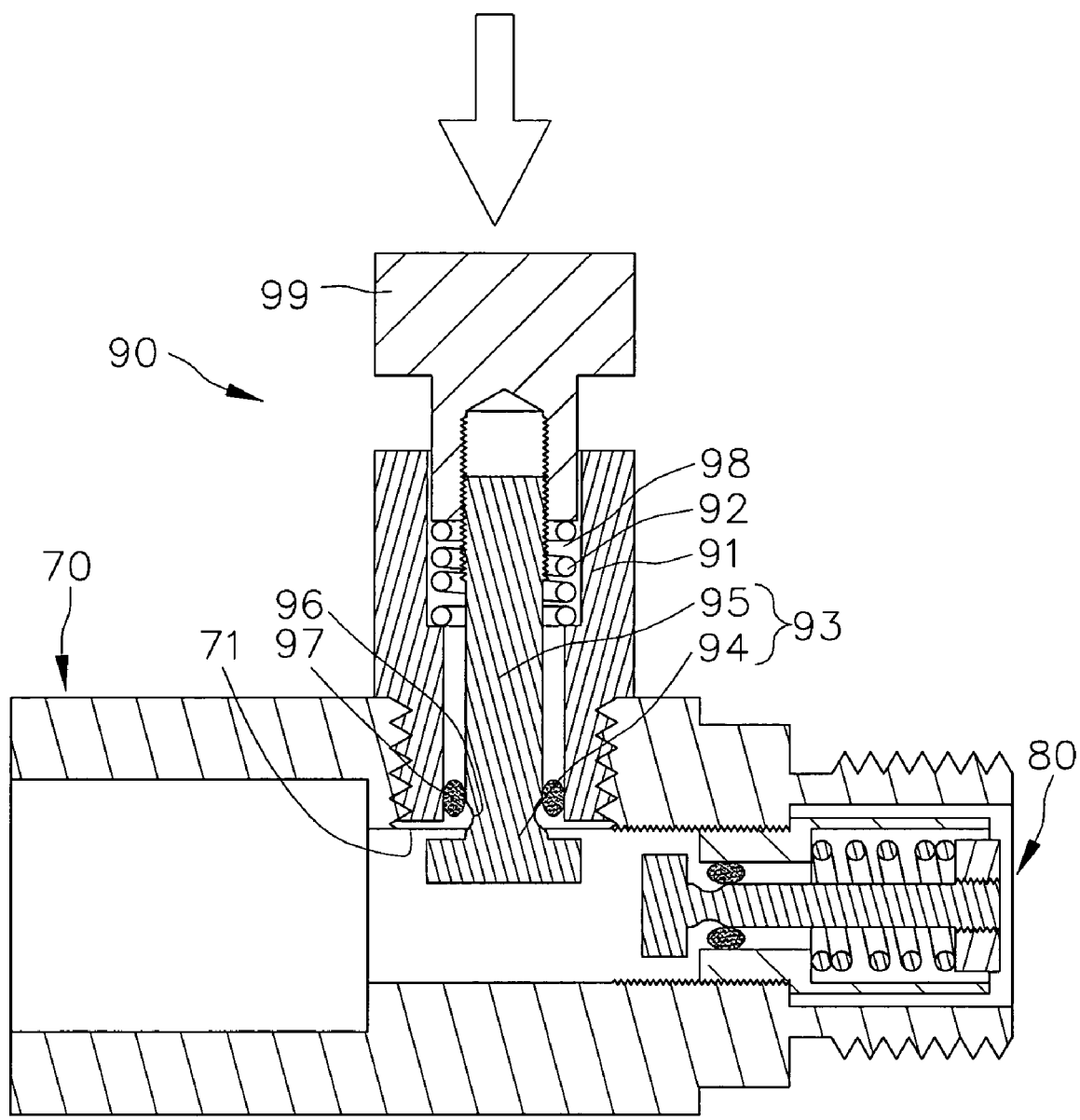
FIG. 2 is a schematic drawing showing an adjustment action of the relief valve assembly according to the prior art.
Figure 3:
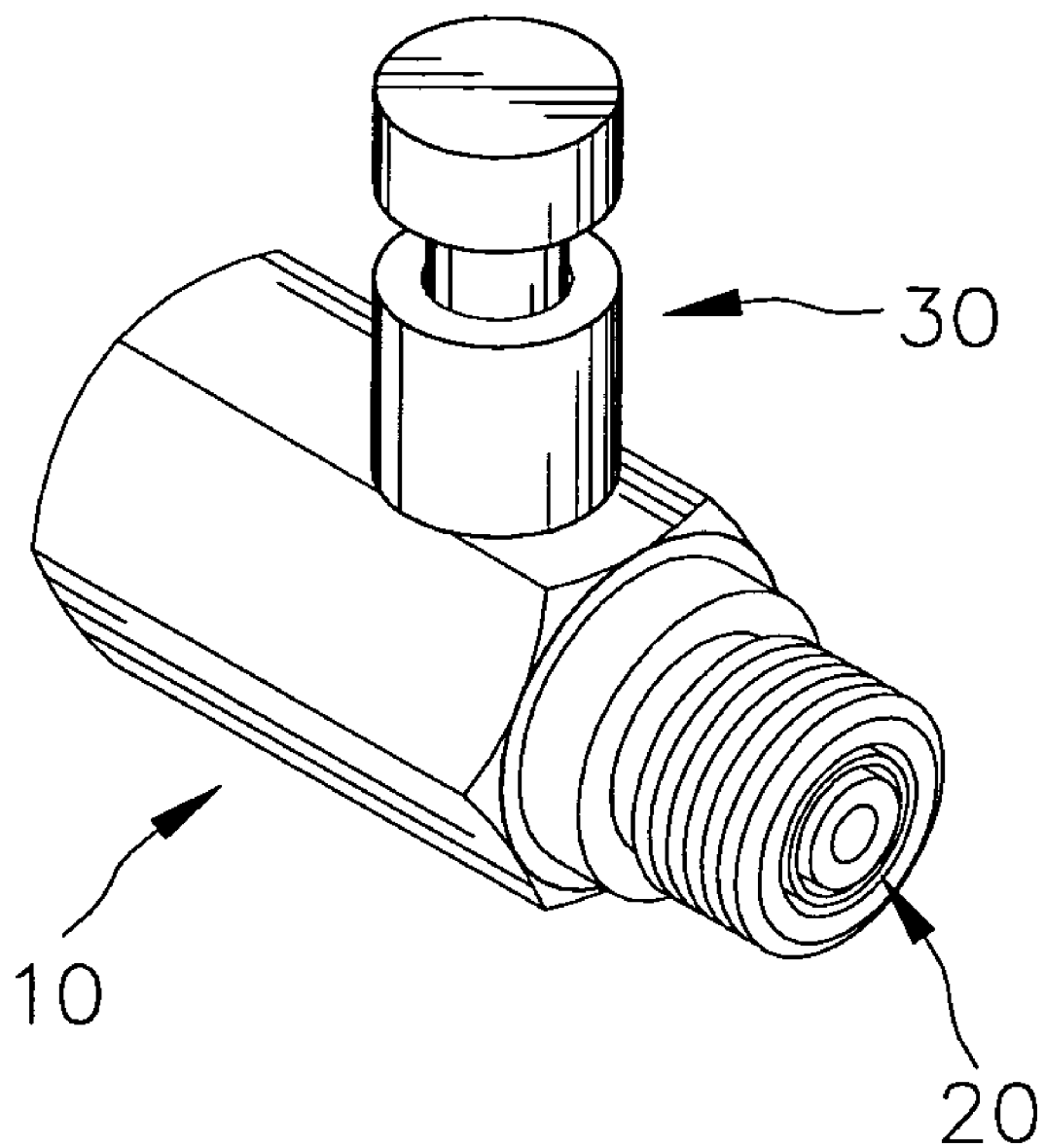
FIG. 3 is an elevational view of a relief valve assembly according to the present invention.

Referring to FIG. 3, a relief valve assembly in accordance with the present invention is shown comprised of a casing 10, an one-way valve 20, and a relief control valve 30.

The casing 10 has an input end and an output end. The one-way valve 20 has one end connected to the input end of the casing 10 and the other end connected to a fluid supply device for selectively guiding a fluid from the fluid supply device into the inside of the casing 10. A pressure gage (not shown) is connected to the output end of the casing 10 for indicating the fluid pressure inside the casing 10. Further, the relief control valve 30 is installed in the top side of the casing 10 between its input and output ends. By means of controlling axial displacement of the relief control valve 30, the fluid is guided out of the casing 10 through the relief control valve 30.

Figure 4:
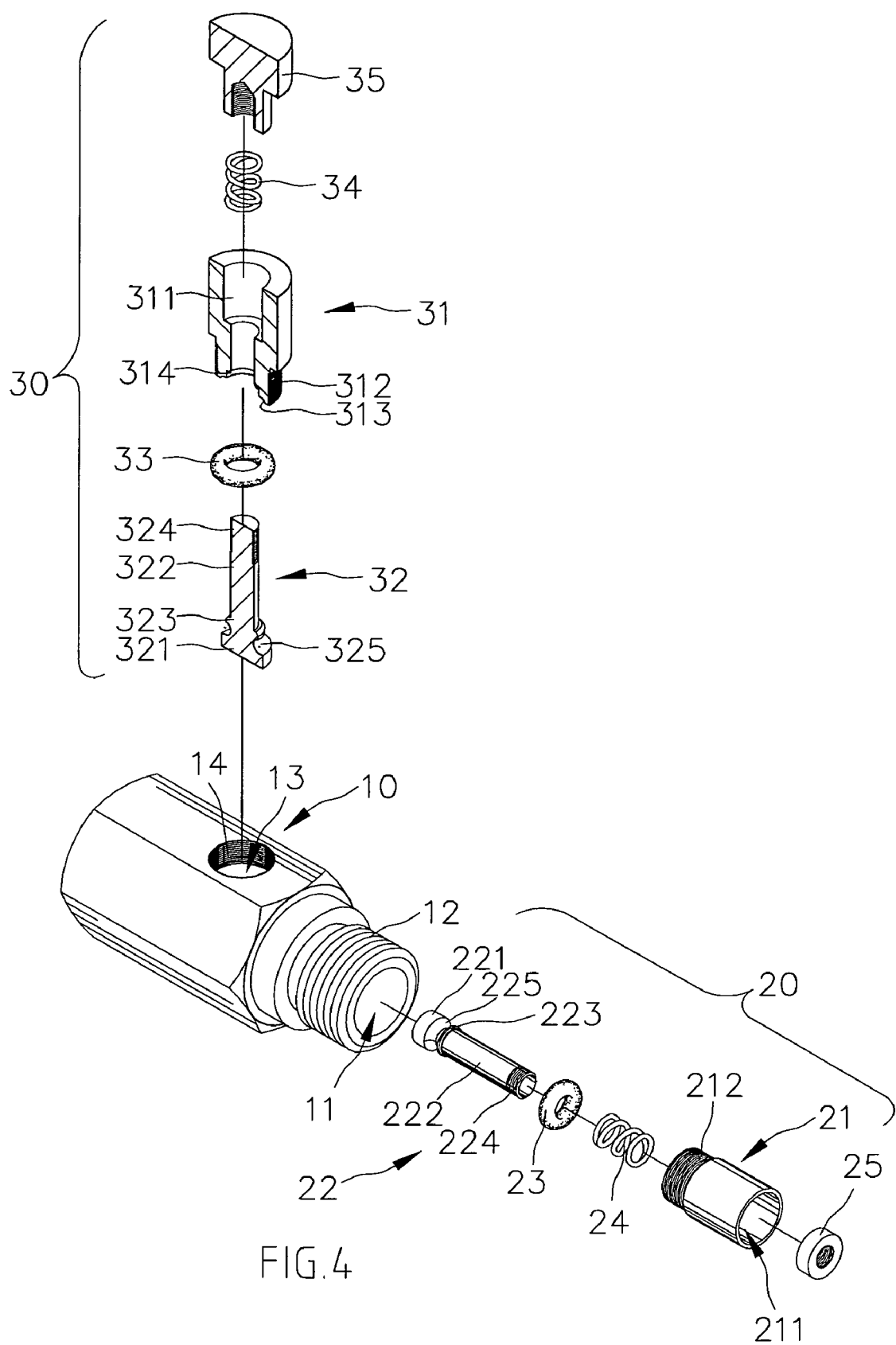
FIG. 4 is an exploded view of the relief valve assembly according to the present invention.
Figure 5:
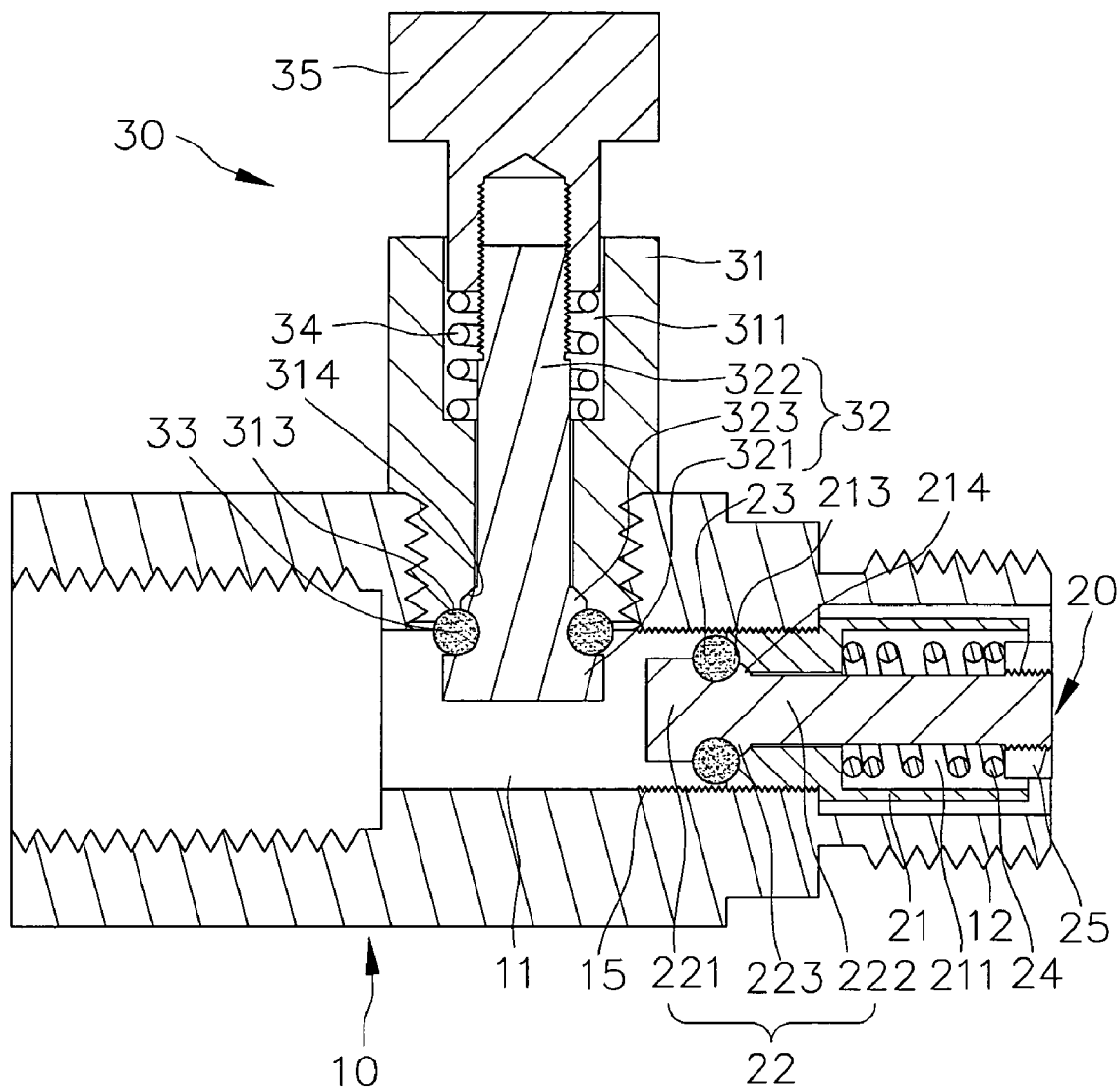
FIG. 5 is a sectional view in an enlarged scale of the relief valve assembly according to the present invention.

Referring to FIGS. 4 and 5, the casing 10 has a first end, and a second end in fluid communication with the first end. The first end is the fluid input end. The casing 10 further defines a passage 11 in communication between the first end and the second end. The one-way valve 20 is plugged into the first end of the casing 10. The casing 10 has an outer thread 12 extended around the periphery of the first end for threading into an inner thread in a fluid supply device (not shown) for guiding in a fluid from the fluid supply device. The second end of the casing 10 is mounted with a pressure gage (not shown), which indicates the pressure of the fluid passing through the second end of the casing 10. The casing 10 further comprises a hole 13 formed in the peripheral wall in fluid communication with the passage 11, and an inner thread 14 formed in the hole 13 for the connection of the relief control valve 30.

The one-way valve 20 is comprised of a first guide tube 21, a first valve stem 22, a first O-ring 23, a first spring member 24, and a first stopper 25. The first guide tube 21 has a first end, a second end, and a passage 211 in fluid communication between the first end and the second end. The passage 211 has a diameter made gradually reducing from the first end of the first guide tube 21 toward the second end of the first guide tube 21. The first end of the first guide tube 21 is an open end for receiving the stopper 25 in such a manner that the fluid can flow from the fluid supply device into the passage 11 of the casing 10 through the gap between the inside wall of the first guide tube 21 and the outside wall of the stopper 25. The second end of the first guide tube 21 has an outer thread 212 extending around the periphery thereof for threading into an inner thread 15 in the passage 11 of the casing 10, a chamfered edge 213 at an outer side, and an annular stop flange 214 on the inside. The first valve stem 22 comprises a head 221, a stem body 222 extending from the head 221, a flange 223 extending around one end of the stem body 222 adjacent to the head 221, a groove 225 extending around the periphery between the head 221 and the stem body 222, and an outer thread 224 extending around the other end of the stem body 222 opposite to the head 221. The first O-ring 23 is fastened to the groove 225 of the first valve stem 22. The first stopper 25 is threaded onto the outer thread 224 of the first valve stem 22. The first spring member 24 is sleeved onto the stem body 222 of the first valve stem 22 and stopped between a part inside the first guide tube 21 and the first stopper 25. The first valve stem 22 is axially movably inserted through the second end of the first guide tube 21 into the passage 211 of the first guide tube 21, keeping the head 221 stopped at the annular stop flange 214 of the first guide tube 21 and the first O-ring 23 stopped at the chamfered edge 213 of the first guide tube 21.

The relief control valve 30 is comprised of a second guide tube 31, a second valve stem 32, a second O-ring 33, a second spring member 34, and a control member 35. The second guide tube 31 has a first end, a second end, and a passage 311 in fluid communication between the first end and the second end. The passage 311 has a diameter made gradually reducing from the first end of the first guide tube 31 toward the second end of the first guide tube 31. The first end of the second guide tube 31 is an open end. The second end of the second guide tube 31 has an outer thread 312 extending around the periphery thereof for threading into an inner thread 14 in the hole 13 of the casing 10, a chamfered edge 313 at an outer side, and an annular stop flange 314 on the inside. The second valve stem 32 comprises a head 321, a stem body 322 extending from the head 321, a flange 323 extending around one end of the stem body 322 adjacent to the head 321, a groove 325 extending around the periphery between the head 321 and the flange 323, and an outer thread 324 extending around the other end of the stem body 322 opposite to the head 321. The second O-ring 33 is fastened to the groove 325 of the second valve stem 32. The control member 35 is threaded onto the outer thread 324 of the second valve stem 32. The second spring member 34 is sleeved onto the stem body 322 of the second valve stem 32 and stopped between a part inside the second guide tube 31 and the control member 35. The second valve stem 32 is axially movably inserted through the second end of the second guide tube 31 into the passage 311 of the second guide tube 31, keeping the head 321 stopped at the annular stop flange 314 of the second guide tube 31 and the second O-ring 33 stopped at the chamfered edge 313 of the second guide tube 31.

Figure 6:
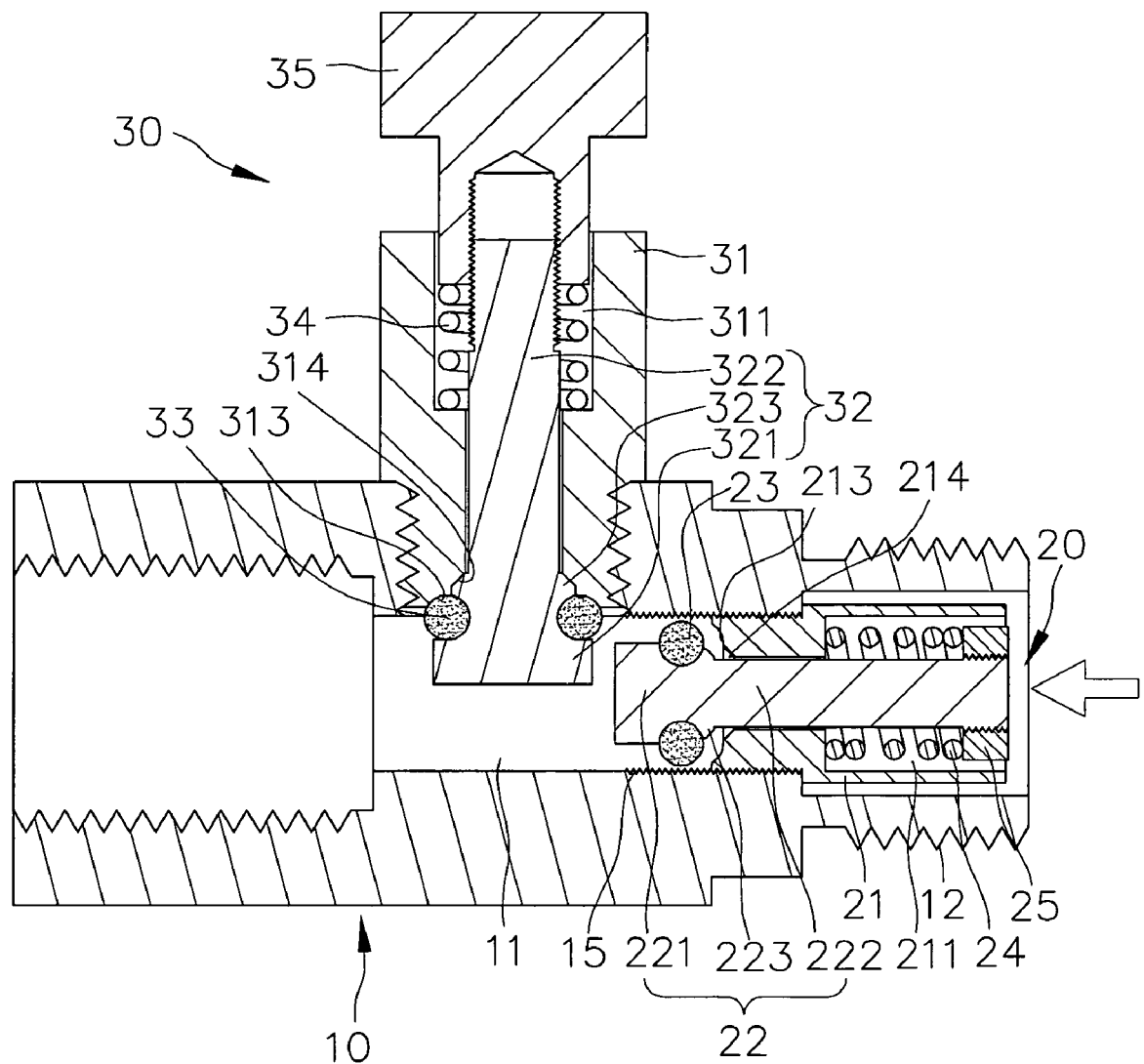
FIG. 6 is similar to FIG. 5 but showing the first O-ring moved with the first valve stem of the one-way valve away from the chamfered edge of the first guide tube and the passage of the first guide tube opened.

Referring to FIG. 6, when the fluid supply device is opened to supply a fluid, the pressure of the fluid forces the first stopper 25 to move the first valve stem 22 toward the second end of the casing 10, thereby causing the head 221 of the first valve stem 22 to be spaced from the annular stop flange 214 of the first guide tube 21 and the first O-ring 23 to be spaced from the chamfered edge 213 of the first guide tube 21, for allowing the fluid to pass through the passage 211 of the first guide tube 21 into the casing 10, and the pressure of the fluid in the casing 10 is measured and indicated by the pressure gage at the second end of the casing 10.

Figure 7:
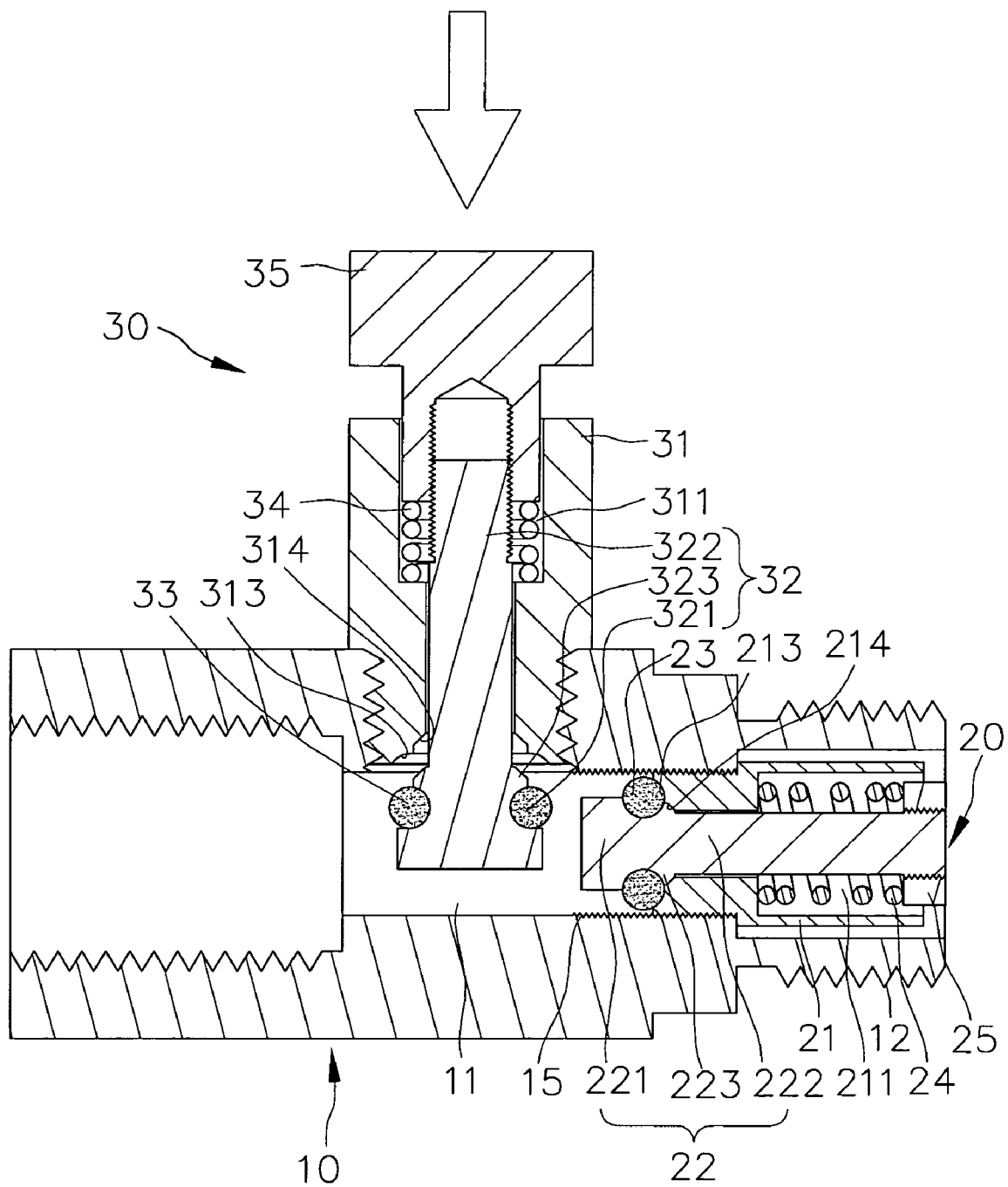
FIG. 7 is similar to FIG. 5 but showing the control member pressed, the second valve stem moved inward toward the inside of the casing, and the passage of the second guide tube opened.

Referring to FIG. 7, when the pressure of the fluid in the casing 10 surpassed the predetermined critical level, the user can press the control member 35 to push the second valve stem 32 toward the inside of the casing 10, thereby causing the head 321 of the second valve stem 32 to be spaced from the annular stop flange 314 of the second guide tube 31 and the second O-ring 33 to be spaced from the chamfered edge 313 of the second guide tube 31, for allowing the fluid to pass out of the casing 10 through the passage 311 of the second guide tube 31 to reduce the fluid pressure in the casing 10.

As stated above, the second O-ring 33 is fastened to the groove 325 of the second valve stem 32, therefore the second O-ring 33 firmly stopped between the flange 323 and the head 321. When the fluid is continuously guided forced into the casing 10, the pressure of the fluid forces the second valve stem 32 outwards, thereby causing the head 321 to be stopped at the annular stop flange 314 of the second guide tube 31 and the second O-ring 33 to be stopped at the chamfered edge 313 of the second guide tube 31. Therefore, the increasing of fluid pressure in the casing 10 does not cause the second O-ring 34 to move away from the groove 325 of the second valve stem 32.

Figure 8:
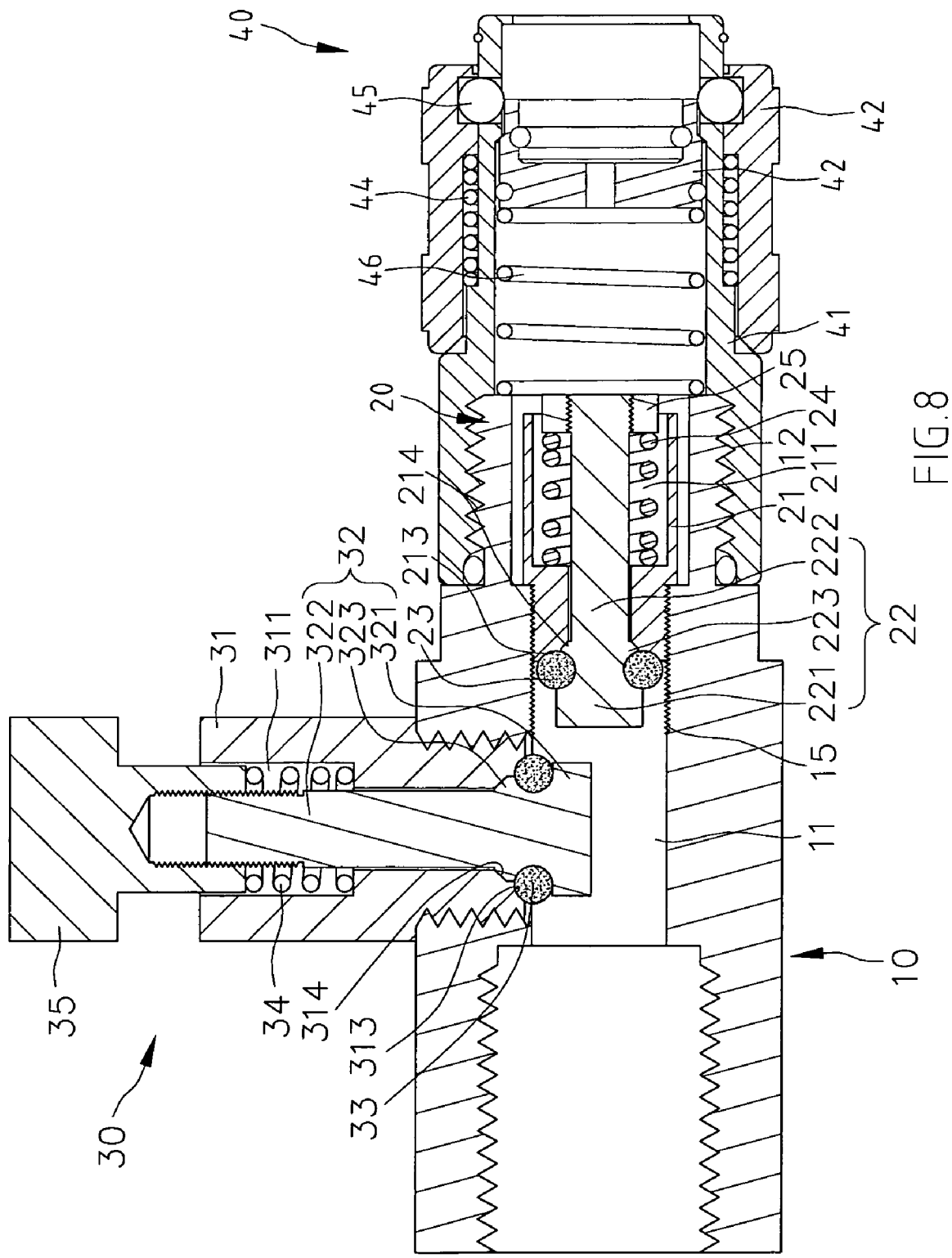
FIG. 8 is similar to FIG. 5 but showing a chuck fastened to the first end of the casing.

Referring to FIG. 8, a check 40 may be fastened to the first end of the casing 10 for connecting the relief valve assembly to an air-driven tool or the like. The chuck 40 comprises a mounting tube 41 threaded onto the outer thread 12 of the casing 10, a shell 42 sleeved onto the mounting tube 41, a first spring member 44 axially connected between the mounting tube 41 and the shell 42, a plurality of steel balls 45 mounted in equally spaced radial through holes (not shown) around the periphery of the mounting tube 41 within the shell 42, a movable member 43 axially movably mounted inside the mounting tube 41, and a second spring member 46 stopped between the first end of the one-way valve 20 and the movable member 43 to support the movable member 43 in such a position that the movable member 43 force the steel balls 45 radially outwards.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A relief valve assembly comprising:
    a casing, said casing having a fist end, and a second end;
    an one-way valve mounted in the first end of said casing for allowing a fluid to pass through the first end of said casing toward the second end of casing and prohibiting reverse flow of said fluid out of said casing through the first end of said casing; and
    a relief control valve installed in said casing between the first end and second end of said casing and controllable to discharge said fluid out of said casing through said relief control valve;
    wherein:
    said relief control valve comprises:
    a guide tube fastened to said casing, said guide tube comprising a passage extending through two distal ends thereof in fluid communication between the first end and second end of said casing, said guide tube having a stop flange at one end of the passage of said guide tube;
    a valve stem axially movable inserted through said guide tube, said valve stem comprising a head for stopping against said stop flange of said guide tube to seal the passage of said guide tube, a stem body extending from said head, a flange extending around the periphery of one end of said stem body, and a groove extending around the periphery between said head and the flange of said stem body;
    an O-ring mounted in said groove of said valve stem and stopped between said head and the flange of said stem body; and
    a spring member sleeved onto said stem body and stopped between a part inside said guide tube and one end of said stem body of said valve stem remote from said head of said valve stem to support said valve stem in a close position where said head of said valve stem is stopped against said stop flange of said guide tube and said O-ring is stopped at one end of the passage of said guide tube to block the passage of said guide tube and for enabling said valve stem to be moved axially relative to said guide tube from said close position to an open position to move said head and said O-ring away from said guide tube and to open the passage of said guide tube.

2. The relief valve assembly as claimed in claim 1, wherein said guide tube has a chamfered edge at one end of the passage thereof for stopping against said O-ring.

3. The relief valve assembly as claimed in claim 1, wherein the first end of said casing is a fluid input end connectable to a fluid supply device; the second end of said casing is mounted with a pressure gage that measures and indicates the inside pressure of said casing.

4. The relief valve assembly as claimed in claim 1, wherein said casing further comprises a radial through hole formed in the periphery thereof in fluid communication between the first end and second end of said casing for holding said relief control valve.

5. The relief valve assembly as claimed in claim 1, wherein said guide tube has a first end and a second end, the second end of said guide tube being fastened to said casing in fluid communication between the first end and second end of said casing; said stem body of said valve stem extends through the first end of said guide tube and fastened with a control member outside said guide tube for pressing by the user to move said valve stem axially relative to said guide tube to open the passage of said guide tube.

6. The relief valve assembly as claimed in claim 1, further comprising a chuck provided at the first end of said casing for connecting said casing to an external device.

7. The relief valve assembly as claimed in claim 6, wherein said chuck comprises a mounting tube fastened to the first end of said casing, a shell axially slidably sleeved onto said mounting tube, and a movable member mounted axially movably mounted inside said mounting tube.

8. A relief valve assembly comprising:
    a casing, said casing having a fist end, and a second end;
    an one-way valve mounted in the first end of said casing for allowing a fluid to pass through the first end of said casing toward the second end of casing and prohibiting reverse flow of said fluid out of said casing through the first end of said casing; and
    a relief control valve installed in said casing between the first end and second end of said casing and controllable to discharge said fluid out of said casing through said relief control valve;
    wherein:
    said one-way valve comprises:
    a guide tube fastened to the first end of said casing, said guide tube comprising a passage extending through two distal ends thereof in fluid communication with the first end of said casing, said guide tube having a stop flange at one end of the passage of said guide tube;
    a valve stem axially movable inserted through said guide tube, said valve stem comprising a head for stopping against said stop flange of said guide tube to seal the passage of said guide tube, a stem body extending from said head, a flange extending around the periphery of one end of said stem body, and a groove extending around the periphery between said head and the flange of said stem body;
    an O-ring mounted in said groove of said valve stem and stopped between said head and the flange of said stem body; and
    a spring member sleeved onto said stem body and stopped between a part inside said guide tube and said one end of said stem body of said valve stem remote from said head of said valve stem to support said valve stem in a close position where said head of said valve stem is stopped against said stop flange of said guide tube and said O-ring is stopped at one end of the passage of said guide tube to block the passage of said guide tube and for enabling said valve stem to be moved axially relative to said guide tube from said close position to an open position by an external pressure to disengage said head and said O-ring from said guide tube and to open the passage of said guide tube.

9. The relief valve assembly as claimed in claim 8, wherein said guide tube has a chamfered edge at one end of the passage thereof for stopping against said O-ring.

10. The relief valve assembly as claimed in claim 8, wherein the first end of said casing is a fluid input end connectable to a fluid supply device; the second end of said casing is mounted with a pressure gage that measures and indicates the inside pressure of said casing.

11. The relief valve assembly as claimed in claim 8, wherein said casing further comprises a radial through hole formed in the periphery thereof in fluid communication between the first end and second end of said casing for holding said relief control valve.

12. The relief valve assembly as claimed in claim 8, wherein said guide tube has a first end and a second end, the second end of said guide tube being fastened to said casing in fluid communication between the first end and second end of said casing; said stem body of said valve stem extends through the first end of said guide tube and mounted with a stopper outside said guide tube, said stopper being adapted to receive an external pressure to move said valve stem to said open position.

13. The relief valve assembly as claimed in claim 8, further comprising a chuck provided at the first end of said casing for connecting said casing to an external device.

14. The relief valve assembly as claimed in claim 13, wherein said chuck comprises a mounting tube fastened to the first end of said casing, a shell axially slidably sleeved onto said mounting tube, and a movable member mounted axially movably mounted inside said mounting tube.

\* \* \* \* \*